United States Patent
Pazhyannur et al.

(10) Patent No.: US 11,115,426 B1
(45) Date of Patent: Sep. 7, 2021

(54) DISTRIBUTED PACKET CAPTURE FOR NETWORK ANOMALY DETECTION

(71) Applicant: Cisco Technology, Inc., San Jose, CA (US)

(72) Inventors: Rajesh S. Pazhyannur, Fremont, CA (US); Manoj Gupta, Bangalore (IN); Sanjay Kumar Hooda, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 119 days.

(21) Appl. No.: 16/219,596

(22) Filed: Dec. 13, 2018

(51) Int. Cl.
*H04L 29/06* (2006.01)
*H04L 12/26* (2006.01)
*H04W 12/00* (2021.01)

(52) U.S. Cl.
CPC .......... *H04L 63/1425* (2013.01); *H04L 43/04* (2013.01); *H04L 43/065* (2013.01); *H04L 63/1416* (2013.01); *H04L 63/1441* (2013.01); *H04W 12/00* (2013.01)

(58) Field of Classification Search
CPC ............. H04L 63/1425; H04L 63/1416; H04L 63/1441; H04L 43/04; H04L 43/065; H04W 12/00
See application file for complete search history.

(56) References Cited

U.S. PATENT DOCUMENTS

| | | | |
|---|---|---|---|
| 9,210,181 B1 | 12/2015 | Mandy et al. | |
| 9,450,978 B2 | 9/2016 | Vasseur et al. | |
| 9,503,467 B2 | 11/2016 | Lefebvre et al. | |
| 9,930,057 B2 | 3/2018 | Di Pietro et al. | |
| 2005/0044208 A1* | 2/2005 | Jones | H04L 43/00 709/224 |
| 2008/0049631 A1* | 2/2008 | Morrill | H04L 43/065 370/250 |
| 2008/0049641 A1* | 2/2008 | Edwards | H04L 43/0852 370/253 |
| 2009/0222924 A1* | 9/2009 | Droz | H04L 63/1425 726/24 |
| 2010/0115620 A1* | 5/2010 | Alme | H04L 63/1416 726/24 |
| 2014/0289840 A1* | 9/2014 | Jain | H04L 63/0245 726/13 |

(Continued)

FOREIGN PATENT DOCUMENTS

WO 2016164050 A1 10/2016

OTHER PUBLICATIONS

Borisov et al., "Hidden Markov Model Approach to TCP Link State Tracking," 43rd IEEE Conference on Decision and Control, 2004, pp. 1-6.

(Continued)

*Primary Examiner* — Cheng-Feng Huang
(74) *Attorney, Agent, or Firm* — Merchant & Gould P.C.

(57) ABSTRACT

Distributed packet capture for network anomaly detection may be provided. An anomaly may be detected at a first network device of a plurality of network devices. One or more target network devices of the plurality of network devices may be identified based on a property associated with the anomaly. A set of packets may be received from the one or more target network devices. A source of the anomaly may be determined based on the received set of packets.

20 Claims, 3 Drawing Sheets

(56) References Cited

U.S. PATENT DOCUMENTS

| | | | |
|---|---|---|---|
| 2015/0128274 A1* | 5/2015 | Giokas | H04L 63/1425 726/23 |
| 2015/0229669 A1* | 8/2015 | Xin | H04L 67/10 726/23 |
| 2015/0332054 A1* | 11/2015 | Eck | G06F 21/577 726/25 |
| 2016/0219065 A1 | 7/2016 | Dasgupta et al. | |
| 2017/0093907 A1* | 3/2017 | Srivastava | H04L 63/1458 |
| 2017/0126718 A1* | 5/2017 | Baradaran | H04L 63/0281 |
| 2019/0207839 A1* | 7/2019 | Arneja | H04L 43/065 |
| 2020/0067974 A1* | 2/2020 | Konda | H04L 63/0263 |

OTHER PUBLICATIONS

Munz et al., "TCP Traffic Classification Using Markov Models," 2010, pp. 1-14.

Salamatian et al., "Hidden Markov Modeling for network communication channels," 2001 ACM SIGMETRICS, 2001, pp. 92-101.

Wei et al., "Continuous-time hidden Markov models for network performance evaluation," Performance Evaluation 49, 2002, pp. 129-146.

Whalen et al., "Hidden Markov Models for Automated Protocol Learning," SecureComm 2010, LNICST 50, 2010, pp. 115-28.

* cited by examiner

DISTRIBUTED PACKET CAPTURE FOR NETWORK ANOMALY DETECTION

TECHNICAL FIELD

The present disclosure generally relates to network security.

BACKGROUND

An anomaly detection system may detect intrusions into a network by detecting behavior, such as traffic patterns, that falls outside the range of normal behavior. Unlike intrusion detection systems that rely on detecting signatures characteristic of known attacks, anomaly detection systems may not require target rules or signatures to be specified to detect anomalies. Further, anomaly detection systems may be able to detect novel attacks. However, certain existing anomaly detection systems are unable to determine the nature of an attack.

BRIEF DESCRIPTION OF THE DRAWINGS

For an understanding of aspects of various embodiments described herein and to show how they may be carried into effect, reference is made, by way of example only, to the accompanying drawings.

DESCRIPTION OF EXAMPLE EMBODIMENTS

Overview

Figure 1:
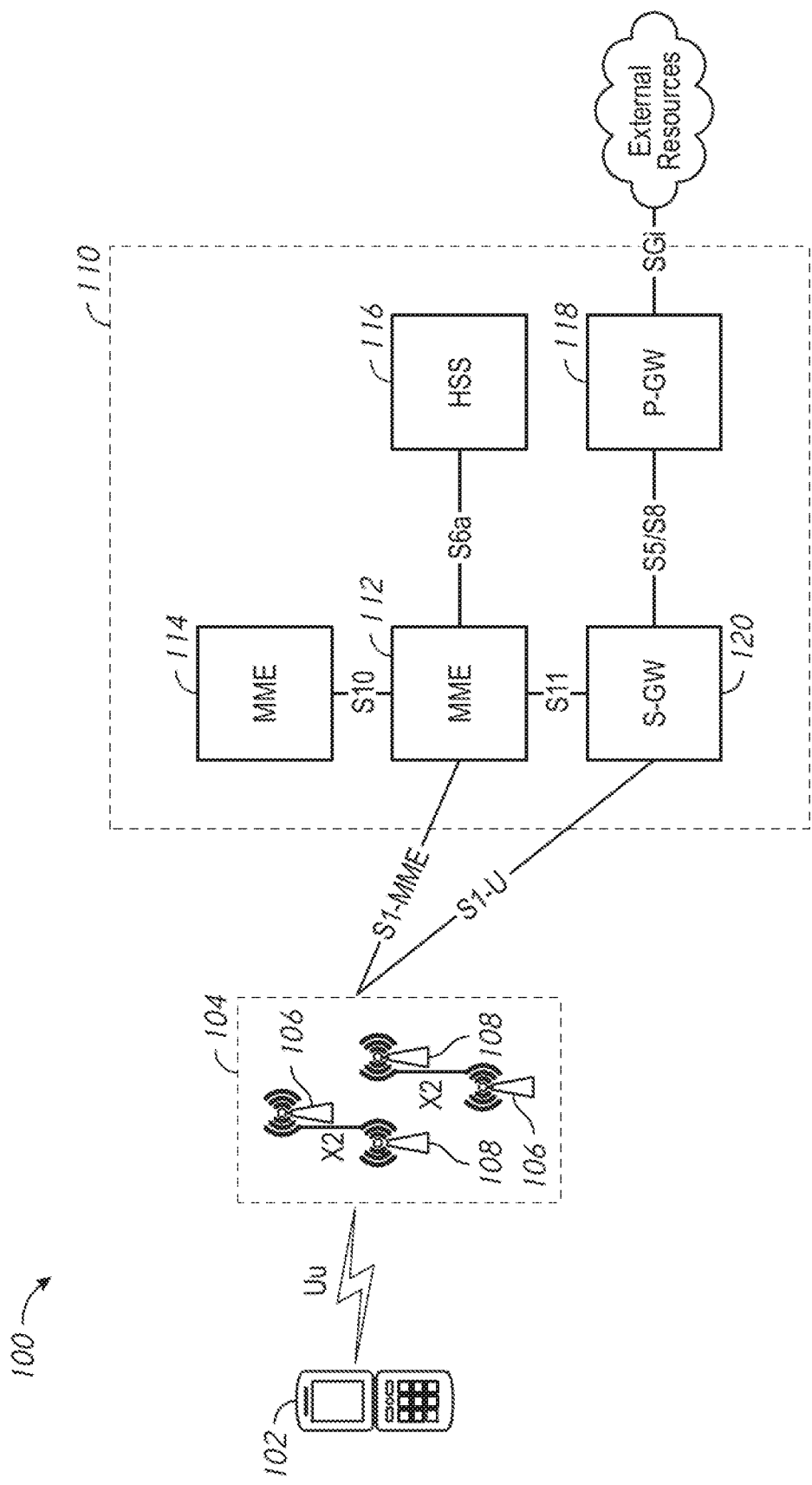
FIG. 1 is a diagram that illustrates an example network.

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Various embodiments disclosed herein may include devices, systems, and methods for capturing packets across multiple network devices in response to detecting an anomaly. This distributed capture of packets may be coordinated by a central controller. The nature of the anomaly may determine the devices from which packets may be captured. The packets may be buffered so that historical packets can be reviewed in order to determine the nature of the anomaly.

In an embodiment, a device comprising a non-transitory memory and a processor coupled to the non-transitory memory may be in communication with a plurality of network devices. The device may detect an anomaly at a first network device of the plurality of network devices. The device may identify one or more target network devices of the plurality of network devices based on a property associated with the anomaly. The device may receive a set of packets from the one or more target network devices. The device may determine a source of the anomaly based on the received set of packets.

EXAMPLE EMBODIMENTS

FIG. 1 illustrates an example long term evolution (LTE) network 100. The LTE network 100 may include a user equipment (UE) device 102, such as a mobile telephone. It will be appreciated that the LTE network 100 typically includes multiple UE devices 102; however, one UE device 102 is depicted for purposes of simplicity.

The LTE network 100 may include an access network, e.g., an evolved universal mobile telecommunications system (UMTS) terrestrial radio access network (E-UTRAN) 104. The UE device 102 may communicate with the E-UTRAN 104 via a Uu interface. The E-UTRAN 104 may include one or more E-UTRAN Node B, also known as evolved node B (e.g., eNodeB or eNB), entities 106. The E-UTRAN 104 may include one or more next generation NodeB (gNB) entities 108. The one or more gNB entities 108 may be in communication with the one or more eNB entities 106 via one or more X2 interfaces.

The LTE network 100 may include a core network, e.g., an evolved packet core (EPC) network 110. The E-UTRAN 104 may communicate with the EPC network 110 using an S1 interface, which may include an S1-MME interface and/or an S1-U interface. The EPC network 110 may include one or more mobility management entities (MMEs) 112, 114. The one or more MMEs 112, 114 may communicate with the E-UTRAN 104 via an S1-MME interface and may communicate with one another via an S10 interface. The one or more MMEs 112, 114 may control high-level operation of the EPC network 110 using signaling messages and a home subscriber server (HSS) 116, with which they may communicate via an S6a interface. The HSS 116 may serve as a central database that may include information regarding the network operator's subscribers.

The EPC network 110 may also include a packet data network (PDN) gateway (PGW) 118. The PGW 118 may communicate with external resources, e.g., servers and/or packet data networks, via the SGi interface. A serving gateway (SGW) 120 may communicate with the MMEs 112, 114 using an S11 interface and with the E-UTRAN 104 using the S1-U interface. The SGW 120 may forward data between a base station and the PGW 118. The SGW 120 and the PGW 118 may communicate with one another via an S5/S8 interface.

When the UE device 102 establishes a connection with the LTE network 100, an eNB entity 106 may select an MME, e.g., the MME 112 or the MME 114, with which the UE device 102 may register. If the UE device 102 has fifth generation (5G) capability, it may publish its 5G capability in non-access stratum (NAS) messaging. AN MME that has 5G non-standalone architecture (NSA) capability may extract the UE device capability information from the NAS messaging and may receive 5G subscription information for the subscriber from the HSS 116. A 5G-capable MME may assist in establishing 5G sessions in the LTE network 100.

A network may use packet capture functionality to determine the nature of problems that may arise in the network. For example, a network device may capture packets that are received by or sent from the network device. However, the network may capture packets inefficiently. For example, the network may capture packets that may not be pertinent to determining the nature of a problem. Accordingly, a device that captures packets inefficiently may use excessive memory and/or processing resources. It may be impractical to have a packet capture process constantly running in view of the demand on resources.

In some embodiments, a device may select packets to capture based on the properties of a detected anomaly. The captured packets may be pertinent to determining the source of the anomaly. For example, in some embodiments, a device, such as a controller, may coordinate packet capture across one or more networks or subnetworks based on a detected anomaly. The controller may select one or more devices from which to capture packets based on the type of anomaly. The controller may select, for capturing, one or more types of packets that may be transmitted from the one or more network devices. As another example, in some embodiments, the controller may select, for capturing, packets from particular types of network devices.

For example, a device, such as a controller (e.g., a central controller), may detect an anomaly that relates to voice transmission to access points that are in a particular subnetwork of a network. The anomaly may not relate to access points that are outside of the subnetwork. In this example, voice packets that are transmitted from network devices that exclusively serve the subnetwork may be pertinent to determining the source of the anomaly.

In some embodiments, a device may capture packets (e.g., all packets) that are transmitted from network devices that exclusively serve the subnetwork. In some embodiments, a device may capture voice packets that are transmitted from network devices that exclusively serve the subnetwork or from other devices in the network. In some embodiments, a device may capture voice packets that are transmitted from (e.g., only from) network devices that exclusively serve the subnetwork. Packets that are transmitted by particular network devices that may be pertinent to determining the source of an anomaly (e.g., network devices that exclusively serve the subnetwork) may be identified. The device may determine the source of the anomaly based on the identified packets.

In some embodiments, one or more network devices may buffer packets, for example, in response to direction or signaling from the controller. When the controller receives a message indicating an anomaly at a network device, the controller may receive buffered packets from that network device to observe both current and historical traffic at the network device. Accordingly, the controller may determine the nature of the anomaly based on current and/or historical data.

Figure 2:
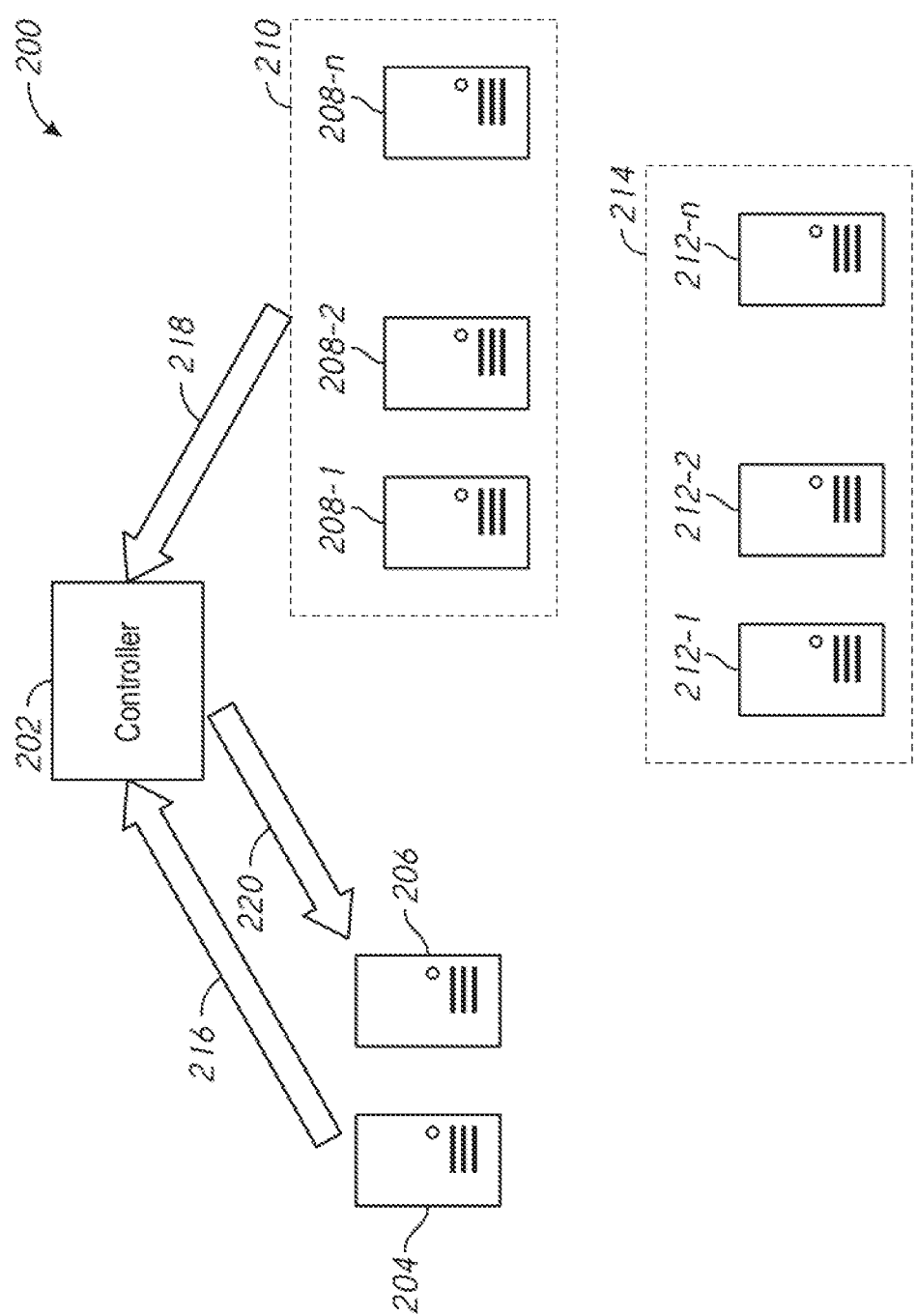
FIG. 2 is a diagram that illustrates an example network.

FIG. 2 illustrates an example network 200. The network 200 may include a controller 202, e.g., a central controller. The controller 202 may be in communication with other devices in the network 200, including, for example, a device 204 and a device 206. The network 200 may also include network devices 208-1, 208-2, . . . , 208-n (collectively referred to as network devices 208), which may be organized as a subnetwork 210. The network 200 may include network devices 212-1, 212-2, . . . , 212-n (collectively referred to as network devices 212), which may be organized as a subnetwork 214.

In some embodiments, the controller 202 may receive a message 216 (e.g., a notification) from the device 204 that may indicate that the device 204 detects an anomaly. The device 204 may detect the anomaly, e.g., by comparing comparable time delay values. The anomaly may occur at the device 206, for example. The message 216 may be or may include information about an event, such as an event identifier, that may be extracted from a data packet.

The device 204 may have detected the anomaly occurring at the device 206 based on topology data relating to the network 200. The device 204 may detect an anomaly occurring at the device 206, for example, if the device 206 is collocated with the device 204. The device 204 may have detected the anomaly occurring at the device 206 if the devices 204 and 206 are logically related. The device 204 may have detected the anomaly occurring at the device 206 if the devices 204 and 206 are different units on a path.

In some embodiments, the device 204 may be the same device as the device 206. For example, an access point (AP) or switch may detect an anomaly relating to itself. In some embodiments, the device 204 may be distinct from the device 206. For example, the device 204 may be implemented as an assurance system that may detect an anomaly occurring on the device 206. The assurance system may be implemented as a centralized entity.

In some embodiments, the message 216 may indicate the nature of the anomaly. The anomaly may relate to an abnormal behavior that may have occurred when transmitting a packet from the device 206. For example, the detected anomaly may correspond to a breach of an acceptable number of packet transmissions, e.g., of a particular type of packet. One or more properties associated with the anomaly may include the type of packet whose acceptable number of transmissions is breached. As another example, the detected anomaly may correspond to a buffer overflow.

As another example, one or more properties associated with the anomaly may include a path tracing of a packet transmitted by the device 206. The path tracing may be determined based on a type of the packet. A central entity may be used to path trace a packet, for example, according to rules that may be specific to a type of the packet and/or the nature of the anomaly. The rules may indicate, for example, which network devices to probe to determine the source of the anomaly.

The message 216 may identify the device 206, e.g., if the device 204 detects an anomaly relating to the device 206. For example, the message 216 may include an identifier corresponding to the device 206. Additionally or alternatively, the message 216 may indicate a type of the device 206. For example, the message 216 may indicate whether the device 206 is an AP, a gateway, a switch, or another type of device.

The message 216 may indicate one or more target network devices that may be of interest in determining the source of the anomaly. The one or more target network devices may be identified by one or more identifiers. Additionally or alternatively, the message 216 may indicate a type of the target network devices.

In some embodiments, in response to receiving the message 216, the controller 202 may identify a set of target network devices in the network 200 based on the detected anomaly. The nature of the anomaly may determine the target network devices from which packets are to be captured. The identified target network devices may be organized in a subnetwork. For example, the controller 202 may identify one or more of the network devices 208 as being of interest, e.g., if the anomaly is determined to be related to the subnetwork 210.

In some embodiments, the controller 202 may identify one or more types of packets as being of interest based on the detected anomaly. The controller 202 may instruct the target network devices to capture and send packets of the one or more types, e.g., and to exclude other types of packets from capturing.

The controller 202 may instruct one or more of the network devices 208 to capture and send target packets 218 associated with the detected anomaly to the controller 202. The target packets 218 may include packets received by one or more of the network devices 208 and/or packets sent by one or more of the network devices 208. The controller 202 may store the target packets 218 in a memory.

One or more of the network devices 208 may store packets to be captured in a buffer (e.g., buffer the packets to be captured). When capturing the packets, the controller 202 and/or one or more of the network devices 208 may retrieve at least one packet from the buffer.

In some embodiments, the controller 202 may determine the nature of the anomaly by reviewing historical data, e.g., previously received packets. For example, the controller 202 may select, from the packets 218 stored in the memory, a set (e.g., a subset) of packets related to the anomaly. The controller 202 may store these selected packets in a buffer (e.g., buffer the selected packets). The buffered packets may include one or more predetermined types of packets, such as, for example, dynamic host configuration protocol (DHCP) packets and/or domain name service (DNS) packets. The controller 202 may use the buffered packets to capture additional sets of packets if the controller 202 detects a subsequent anomaly.

The controller 202 may determine a source of the anomaly, e.g., one or more of the network devices 208, based on the packets 218 and/or the packets stored in the buffer. The controller 202 may take corrective action based on the selected packets stored in the buffer. For example, the controller may provide a notification 220 to the device 206. The notification 220 may include information about the anomaly. The notification 220 may indicate the nature of the anomaly. The notification 220 may indicate that one or more network devices 208 are responsible for or otherwise associated with the anomaly. The notification 220 may indicate corrective action that the device 206 may take to remedy the anomaly.

Figure 3:
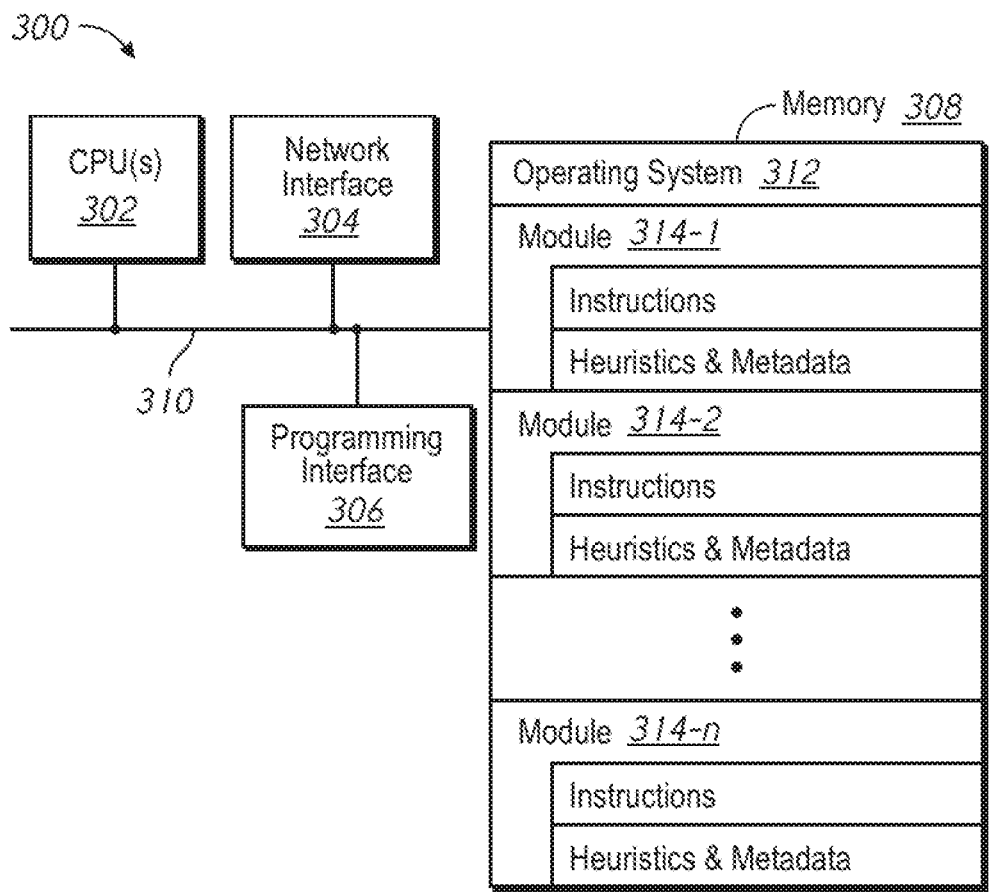
FIG. 3 is a block diagram that illustrates an example server system.

FIG. 3 is a block diagram of an example server system 300 enabled with one or more components of a device, server, or system in accordance with some embodiments. While certain specific features are illustrated, those of ordinary skill in the art will appreciate from the present disclosure that various other features have not been illustrated for the sake of brevity, and so as not to obscure more pertinent aspects of the embodiments disclosed herein. To that end, as a non-limiting example, in some embodiments the server system 300 may include one or more processing units (CPUs) 302, a network interface 304, a programming interface 306, a memory 308, and one or more communication buses 310 for interconnecting these and various other components.

The network interface 304 may be provided to, among other uses, establish and/or maintain a metadata tunnel between a cloud-hosted network management system and at least one private network including one or more compliant devices. In some embodiments, the one or more communication buses 310 may include circuitry that interconnects and controls communications between system components. The memory 308 may include one or more of high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. The memory 308 may include one or more storage devices remotely located from the one or more CPUs 302. The memory 308 may comprise a non-transitory computer readable storage medium.

In some embodiments, the memory 308 or the non-transitory computer readable storage medium of the memory 308 may include (e.g., store) the following programs, modules, and data structures, or a subset thereof including one or more of an operating system 312 or various modules 314-1, 314-2, . . . , 314-n. The modules 314-1, 314-2, . . . , 314-n, individually and/or collectively, perform one or more of the operations described herein. To that end, in various embodiments, the modules 314-1, 314-2, . . . , 314-n may include respective instructions and/or logic, and heuristics and metadata.

Various aspects of embodiments within the scope of the appended claims are described above. It should be apparent that the various features of embodiments described above may be embodied in a wide variety of forms and that any specific structure and/or function described above is merely illustrative. Based on the present disclosure, one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc., may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    detecting an anomaly at a first network device of a plurality of network devices, wherein detecting the anomaly comprises receiving a message relating to the anomaly from one of following: the first network device and a second network device of the plurality of network devices, wherein the anomaly relates to an abnormal behavior that occurred when the first network device transmitted a packet, and wherein the abnormal behavior comprises a breach of an acceptable number of transmissions of the packet;

identifying, based on a property associated with the anomaly, one or more target network devices of the plurality of network devices, wherein the property comprises a type of packet, wherein identifying the one or more target network devices of the plurality of network devices comprises performing path tracing of a packet associated with the anomaly based on one or more rules applicable to the type of packet to identify the one or more target network devices of the plurality of network devices, and wherein the one or more rules indicate which network devices to probe to determine the source of anomaly;

receiving a set of packets from the one or more target network devices; and determining a source of the anomaly based on the received set of packets;

storing the received set of packets in a buffer; and on a condition that a subsequent anomaly is detected, receiving another set of packets based on the set of packets stored in the buffer.

2. The method of claim 1, further comprising:

identifying, based on the property associated with the anomaly, one or more target sets of packets; and receiving the one or more target sets of packets from the one or more target network devices.

3. The method of claim 1, wherein the message indicates the type of the one or more target network devices.

4. The method of claim 1, wherein the message indicates one or more identifiers corresponding to the one or more target network devices.

5. The method of claim 1, further comprising causing the one or more target network devices to capture at least one target packet received by the one or more target network devices.

6. The method of claim 1, wherein the property comprises a type of the one or more target network devices.

7. The method of claim 1, wherein identifying the one or more target network devices of the plurality of network devices comprises performing path tracing of the packet associated with the anomaly based on the one or more rules applicable to the type of packet and a nature of the anomaly to identify the one or more target network devices of the plurality of network devices.

8. A device comprising:

a hardware memory device; and a processor connected to the memory device, wherein the processor is operative to:

detect an anomaly at a first network device of a plurality of network devices, wherein detecting the anomaly comprises receiving a message relating to the anomaly from one of following: the first network device and a second network device of the plurality of network devices, wherein the anomaly relates to an abnormal behavior that occurred when the first network device transmitted a packet, and wherein the abnormal behavior comprises a breach of an acceptable number of transmissions of the packet;

identify, based on a property associated with the anomaly, one or more target network devices of the plurality of network devices, wherein the property comprises a type of packet, wherein the processor being operative to identify the one or more target network devices of the plurality of network devices comprises the processor being operative to perform path tracing of a packet associated with the anomaly based on one or more rules applicable to the type of packet to identify the one or more target network devices of the plurality of network devices, and wherein the one or more rules indicate which network devices to probe to determine the source of anomaly;

receive a set of packets from the one or more target network devices; and determine a source of the anomaly based on the received set of packets;

store the received set of packets in a buffer; and on a condition that a subsequent anomaly is detected, receive another set of packets based on the set of packets stored in the buffer.

9. The device of claim 8, wherein the processor is further operative to:

identify, based on the property associated with the anomaly, one or more target sets of packets; and receive the one or more target sets of packets from the one or more target network devices.

10. The device of claim 8, wherein the message indicates one or more identifiers corresponding to the one or more target network devices.

11. The device of claim 8, wherein the processor is further operative to cause the one or more target network devices to capture at least one target packet received by the one or more target network devices.

12. The device of claim 8, wherein the property comprises a type of the one or more target network devices.

13. The device of claim 8, wherein the processor being operative to identify the one or more target network devices of the plurality of network devices comprises the processor being operative to perform path tracing of the packet associated with the anomaly based on the one or more rules applicable to the type of packet and a nature of the anomaly to identify the one or more target network devices of the plurality of network devices.

14. A non-transitory computer readable storage medium storing instructions, that, when executed perform a method comprising:

detecting an anomaly at a first network device of a plurality of network devices, wherein detecting the anomaly comprises receiving a message relating to the anomaly from one of following: the first network device and a second network device of the plurality of network devices, wherein the anomaly relates to an abnormal behavior that occurred when the first network device transmitted a packet, and wherein the abnormal behavior comprises a breach of an acceptable number of transmissions of the packet;

identifying, based on a property associated with the anomaly, one or more target network devices of the plurality of network devices, wherein the property comprises a type of packet, wherein identifying the one or more target network devices of the plurality of network devices comprises performing path tracing of a packet associated with the anomaly based on one or more rules applicable to a type of packet to identify the one or more target network devices of the plurality of network devices, and wherein the one or more rules indicate which network devices to probe to determine the source of anomaly;

receiving a set of packets from the one or more target network devices; and determining a source of the anomaly based on the received set of packets;

storing the received set of packets in a buffer; and on a condition that a subsequent anomaly is detected, receiving another set of packets based on the set of packets stored in the buffer.

15. The non-transitory computer readable storage medium of claim 14, further comprising identifying, based on the property associated with the anomaly, one or more target sets of packets; and receiving the one or more target sets of packets from the one or more target network devices.

16. The non-transitory computer readable storage medium of claim 14, wherein the message indicates the type of the one or more target network devices.

17. The non-transitory computer readable storage medium of claim 14, wherein the message indicates one or more identifiers corresponding to the one or more target network devices.

18. The non-transitory computer readable storage medium of claim 14, further comprising causing the one or more target network devices to capture at least one target packet received by the one or more target network devices.

19. The non-transitory computer readable storage medium of claim 14, wherein the property comprises a type of the one or more target network devices.

20. The non-transitory computer readable storage medium of claim 14, wherein identifying the one or more target network devices of the plurality of network devices comprises performing path tracing of the packet associated with the anomaly based on the one or more rules applicable to the type of packet and a nature of the anomaly to identify the one or more target network devices of the plurality of network devices.

* * * * *